Sept. 24, 1957  J. R. CONLIN ET AL  2,807,701
EGG COOKER
Filed March 31, 1955  3 Sheets-Sheet 2
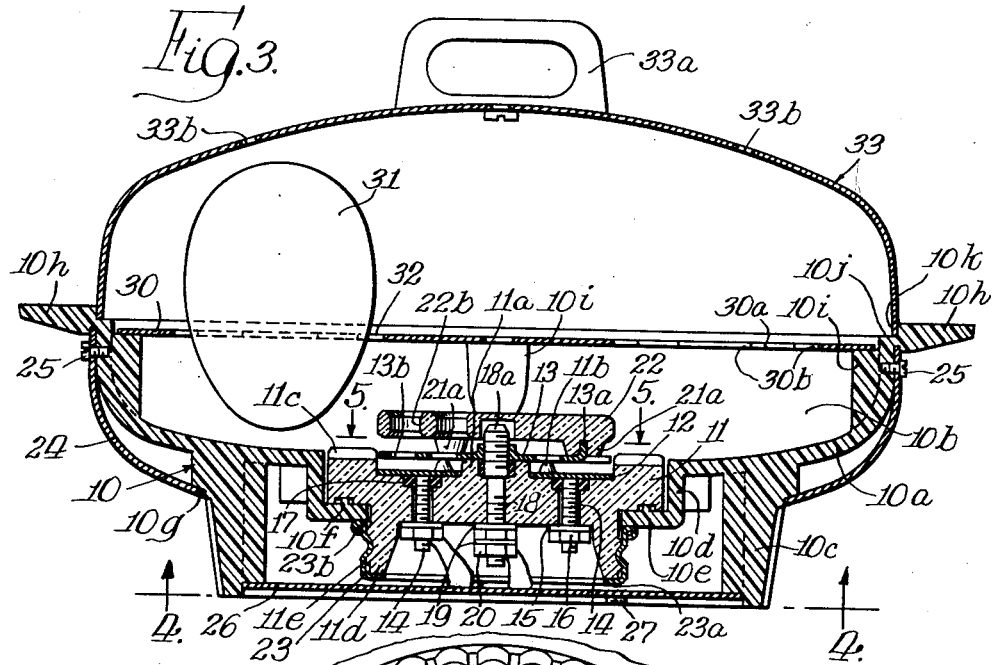
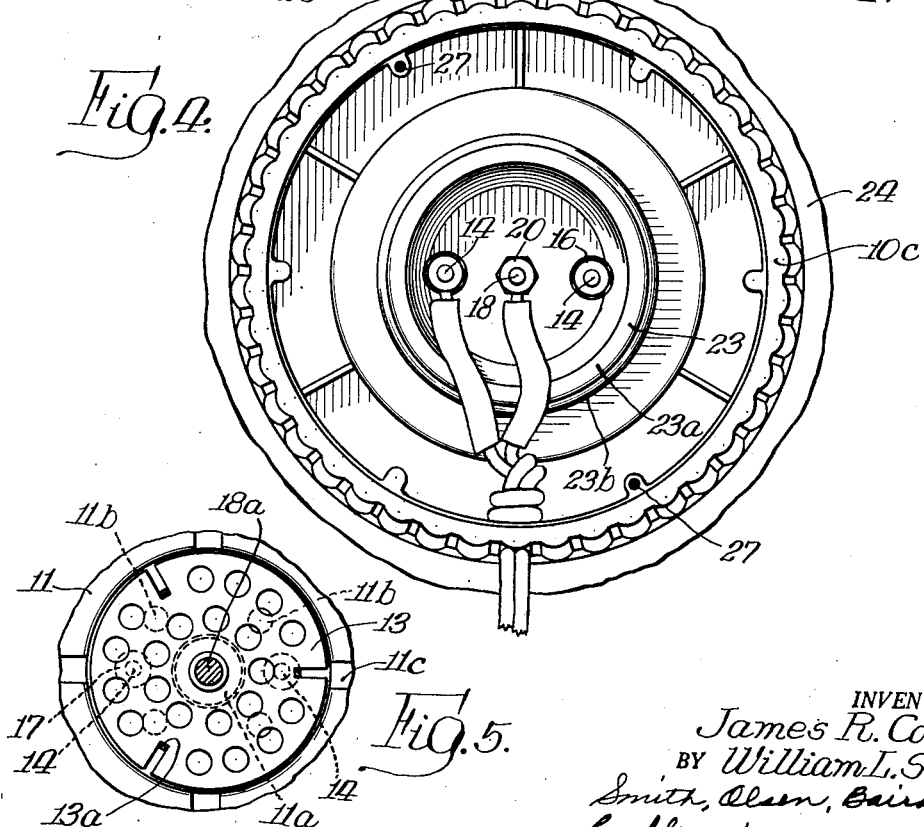
INVENTORS.
James R. Conlin
BY William L. Schulz
Smith, Olsen, Baird &
Gulbrandsen
Attys.

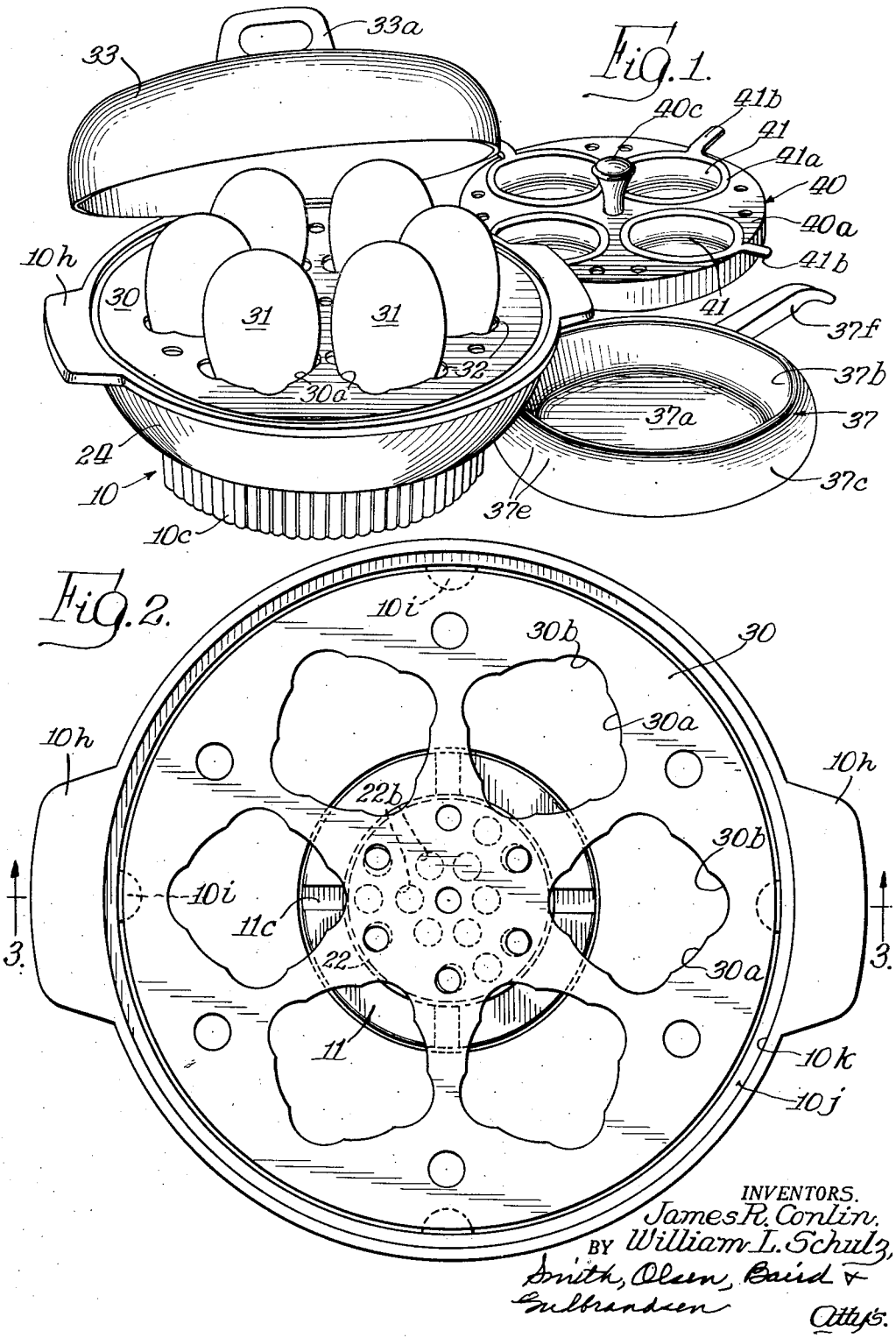

Sept. 24, 1957   J. R. CONLIN ET AL   2,807,701
EGG COOKER
Filed March 31, 1955   3 Sheets-Sheet 3
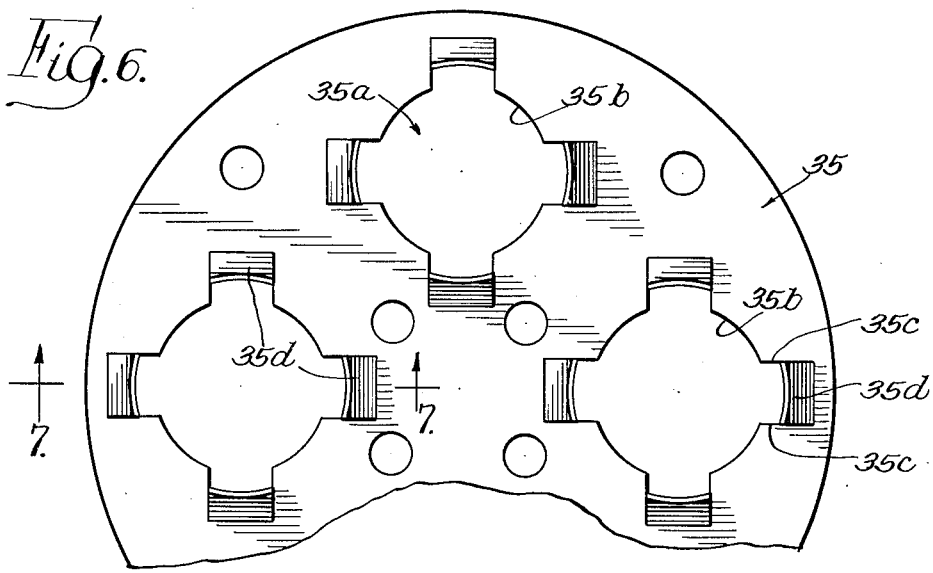
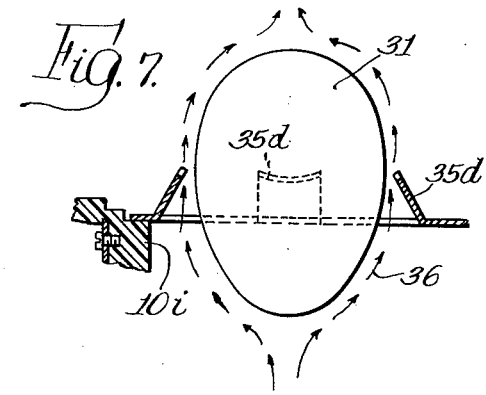
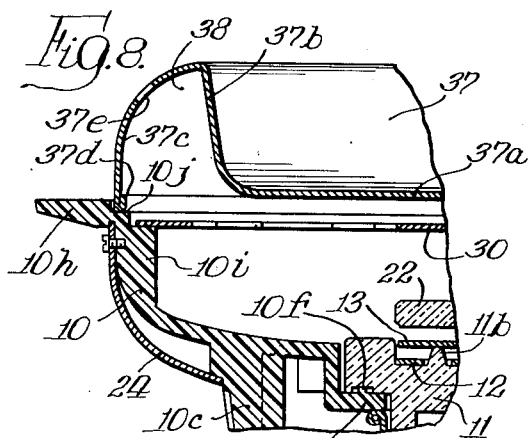
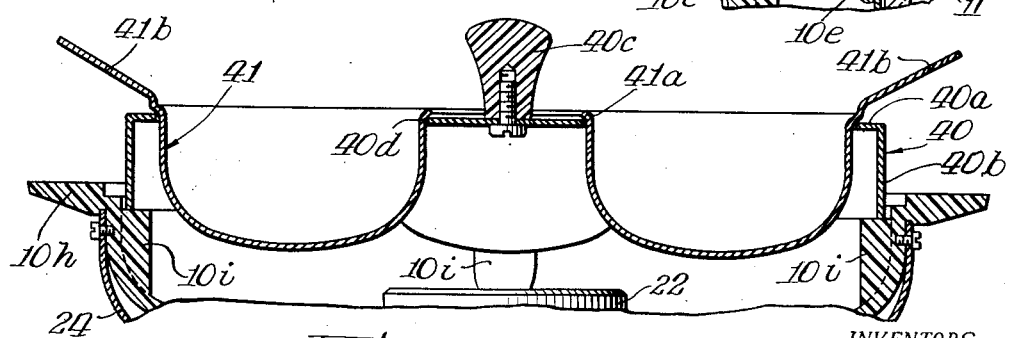
INVENTORS.
James R. Conlin
BY William L. Schulz United States Patent Office 2,807,701
Patented Sept. 24, 1957

2,807,701

EGG COOKER

James R. Conlin and William L. Schulz, Reedsburg, Wis., assignors to Hankscraft Company, Reedsburg, Wis., a corporation of Wisconsin Application March 31, 1955, Serial No. 498,229

8 Claims. (Cl. 219—40)

This invention relates to improvements in egg cookers and its purpose is to provide a novel device which may be used for boiling, poaching or scrambling eggs.

The improvements of the present invention are preferably embodied in heating apparatus of the liquid conductor heater type wherein a measured quantity of water in a vessel is vaporized by the passage of an electric current therethrough between spaced electrodes thereby producing a quantity of steam which is utilized in cooking the eggs. Apparatus of that type has the advantage that it has a definite time period of operation depending upon the quantity of water placed in the vessel so that the eggs may be cooked to a definite predetermined extent.

The principal object of the invention is to provide an egg cooker having a plurality of complementary parts which may be used jointly or in succession to effect the cooking of eggs in a plurality of different ways. A further object of the invention is to provide improved means for supporting eggs during the cooking thereof by the application of steam in order to cause the steam to circulate in an improved manner in contact with the eggs. Still another object of the invention is to provide improved apparatus of the liquid conductor heater type for producing steam in combination with novel means for supporting eggs in a rack to effect the "boiling" thereof, or for supporting them in cups for poaching them, or for supporting them in a pan to be scrambled. Other objects relate to various features of construction and arrangement which will appear more fully hereinafter.

The nature of the invention will be understood from the following specification taken with the accompanying drawings in which one embodiment is illustrated. In the drawings, Figure 1 shows a perspective view of an egg cooker embodying the present invention;

Fig. 2 shows an enlarged top plan view of the egg cooker illustrated in Fig. 1 when it is equipped with those parts which are adapted for the boiling of eggs;

Fig. 3 shows a vertical section taken on the line 3—3 of Fig. 2 with the cover of the egg cooker in position on the vessel;

Fig. 4 shows a botom plan view taken on the line 4—4 of Fig. 3;

Fig. 5 shows a horizontal section taken on the line 5—5 of Fig. 3;

Fig. 6 shows a top plan view of a modified construction of the egg supporting rack which may be employed in place of the rack illustrated in Fig. 2;

Fig. 7 shows a sectional view taken on the line 7—7 of Fig. 6;

Fig. 8 shows a vertical sectional view similar to that of Fig. 3 illustrating a portion of the egg cooker when it is equipped to produce scrambled eggs; and Fig. 9 shows a partial vertical section similar to that of Fig. 3, illustrating the egg cooker when it is equipped for the poaching of eggs.

In Figs. 1 to 5, inclusive, of the drawings the invention is illustrated as being embodied in an egg cooker comprising a vessel 10 adapted to contain a quantity of water which is to be vaporized in the process of cooking the eggs. This vessel is formed of insulating material such as porcelain or plastic material and it comprises a bowl shaped wall 10a forming a chamber 10b in which a quantity of water is adapted to be placed to be vaporized. From the wall 10a, an annular flange 10c extends downwardly and is adapted to rest upon a table or other support. The bottom portion of the wall 10a is provided with a downwardly extending annular flange 10d terminating in an inwardly extending annular flange 10e. An insulating cap 11 is mounted within the flange 10d and rests upon the flange 10e which has an upwardly extending rib 10f adapted to enter a recess in the underside of the member 11. The cap member 11 carries two spaced metal electrodes 12 and 13 between which the electric current is adapted to pass for the purpose of vaporizing the water which is placed in the vessel 10. The lower electrode 12 is in the form of a ring having a central aperture which is engaged by an upwardly extending projection 11a formed on the cap member.

The lower electrode 12 has secured thereto a pair of terminal posts 14 which extend downwardly through apertures in the cap member 11 and which are engaged on their lower threaded extremities by washers 15 and nuts 16. The posts 14 extend through insulating washers 17 of rubber or the like which are mounted in recesses formed in the body portion of the cap member 11 and the lower extremities of these terminal posts are adapted to be connected to one line of an alternating current electric circuit by conductors which are brought into the space beneath the cap member 11 through an aperture in the wall 10c of the vessel 10. The lower electrode 12 is seated in a circular recess which is formed in the cap member 11 around the central projection 11a and it is spaced from the upper electrode 13 by means of insulating lugs 11b which are formed on the cap member 11 and which extend upwardly through apertures in the electrode. The upper electrode 13 has a threaded engagement with the upper enlarged extremity 18a of another terminal post 18 which extends downwardly through the central projection 11a and through the body portion of the cap member, being engaged on its lower threaded extremity by a washer 19 and nuts 20. The other line conductor of the supply circuit is adapted to be connected to the terminal post 18 by clamping the extremity thereof between the nuts 20. In this way, the spaced electrodes 12 and 13 are adapted to be connected in an electric circuit and to perform the function of vaporizing the water in the vessel 10 by the passage of current through that portion of the water which is in the space between the electrodes. When the water in the vessel is completely vaporized, the production of steam ceases and the cooking operation is completed. In order to facilitate the flow of water into the space between the electrodes the upper marginal portion of the cap member 11 is preferably provided with a plurality of radiating grooves 11c in its upper face.

In order to protect the fingers of the user from contact with the electrodes, the upper electrode 13 is provided with a cover plate 22 formed of porcelain or other suitable insulating material which is spaced upwardly from the electrode 13 by downwardly extending lugs 21a formed thereon. These lugs are centrally apertured and these apertures are engaged by upwardly turned tongues 13a formed on the electrode so that a detachable interlocking connection is made between the upper electrode and the cover plate 22. This cover plate is provided with a series of apertures 22b which are adapted to permit the upward flow of steam which is produced by the passage of current between the electrodes 12 and 13 and the upper electrode 13 is similarly provided with a plurality of apertures 13b to permit the upward flow of steam.

The cap member 11 is provided with an annular flange 11d which extends downwardly through the flange 10e of the vessel and which is provided on its outer side with integrally formed threads 11e. These threads are adapted to interlock with similar threads formed on a metal ring 23 which has a flange 23a underlying the flange 11d and which has its upper edge rolled as shown at 23b to seat against the lower surface of the flange 10e of the vessel. In this way the cap member 11 is pressed against the flange 10e and a fluid-tight connection is made between the cap member and the vessel. Thus, the heating unit comprising the spaced electrodes and the cap member 11 is formed as a unitary structure which may be detached from the vessel 10 for cleaning and repair purposes. The vessel 10 is preferably protected on its outer side by an annular metal shell 24 which is secured thereto by screws 25 and which terminates at its lower edge in contact with an annular shoulder 10g formed on the vessel. The vessel 10 is also provided at its upper edge with projecting handles 10h by which the egg cooker may be conveniently moved about. The bottom chamber in which the connections are made with the terminal posts 14 and 18 is preferably closed by a detachable insulating plate 26 which is secured in place by screws 27. The mounting of the electrodes 14 and 18 and their relation to the cap member 11 and the cover plate 22 do not in themselves constitute a part of the present invention since they are claimed in a copending application Serial No. 446,912 filed July 30, 1954.

The vessel 10 is provided on the inner side of its annular wall with a series of inwardly extending lugs 10i which are adapted to form a support for a rack 30. This rack is in the form of a flat metal plate of circular shape and it has a plurality of apertures 30a which are adapted to receive the eggs 31. The eggs are of larger diameter than the minimum dimensions of the apertures 30a so that the eggs are supported with the major portions thereof above the rack 30 as illustrated in Figs. 1 and 3. In order to permit the steam to pass upwardly in direct contact with the eggs 31, the apertures 30a are preferably formed with scallops 30b around their margins so that openings 32 are provided in close proximity to the surfaces of the eggs, thus causing the steam to pass upwardly in direct contact with the eggs during the so-called "boiling" operation which is effected by the action of the steam. Inasmuch as the production of the steam ceases when the water in the vessel 10 is completely vaporized, it will be apparent that the device has a definite time period of operation depending upon the amount of water in the vessel. Accordingly, the extent to which the eggs are cooked may be regulated by measuring the quantity of water which is initially placed in the vessel.

The vessel 10 is also provided around its upper edge with an annular ledge 10j surrounded by an annular shoulder 10k. The ledge 10j is adapted to be engaged by the outer annular edge of a dome-shaped cover 33 provided with a handle 33a by which it may be moved to and from its position on the vessel. This dome-shaped cover is provided with one or more apertures 33b through which the steam within the cover may escape.

In Figs. 6 and 7 of the drawings there is illustrated a modified form of egg supporting rack 35 which is adapted to be mounted in the same manner as the rack 30 and which differs therefrom only in the formation of the apertures 35a which receive the eggs. The walls of these apertures comprise complementary arcuate portions 35b which form segments of a circle adapted to fit the surface of the egg. In order to cause the steam to pass upwardly in direct contact with the eggs, each aperture 35a is arranged to communicate with a series of openings which are formed by cutting the metal of the rack outwardly along parallel lines 35c and then deflecting the intervening metal upwardly to form tongues 35d, four of which are spaced at equal intervals around the margin of each aperture 35a. The tongues 35 are inclined upwardly and inwardly toward the egg, as shown in Fig. 7, so that as the steam passes upwardly from the vessel 10 along lines indicated by the arrows 36, it is directed inwardly into direct contact with the surfaces of the eggs and passes upwardly in contact therewith as shown by the arrows in Fig. 7.

In addition to providing means for cooking eggs through the action of steam by the equivalent of a boiling operation, the present invention also provides means for cooking scrambled eggs in a metal pan 37 which is adapted to take the place of the cover 33 and to rest upon the annular ledge 10j of the vessel as shown in Fig. 8. This pan has a bottom wall 37a connected with an annular upwardly extending wall 37b and this upwardly directed wall is united with an outer wall 37c which is inclined downwardly and outwardly to terminate in an upturned edge portion 37d which rests upon the ledge 10j. There is thus formed a heating chamber 38 between the walls 37b and 37c in which the steam produced by the vaporization of the water is adapted to collect to effect the heating of the eggs in the pan 37. The outer wall 37c is provided with a plurality of apertures 37e through which the steam may escape. The rack 30 previously described is preferably retained in place on the lugs 10i when the pan 37 is in use so that when this pan is being moved about by its handle 37f (Fig. 1) there is no danger of causing the edge of the pan to engage the water in the vessel 10, thereby increasing the safety of operation of the apparatus.

In addition to providing means for producing boiled egg or scrambled eggs, the present invention is also equipped to produce poached eggs by the use of the attachment which is illustrated particularly in Figs. 1 and 9. For this purpose, the cover 33 and the rack 30 are removed and the rack is replaced by a tray 40 having a top plate 40a and an annular depending flange 40b which rests at its lower edge on the lugs 10i. The top wall 40a of the rack 40 is provided with a centrally located handle 40c and it is provided around this handle with a series of circular apertures 40d, each of which is adapted to receive a cup 41 adapted to contain an egg to be poached by the passage of steam in contact with the portion thereof which is located below the plane of the top plate 40a. These cups 41 are flared outwardly at their upper edges as shown at 41a to rest upon the walls of the apertures 40d and they are provided with projecting handles 41b by which they may be lifted out of engagement with the tray 40 to permit the discharge of their contents. The top plate 40a of the tray 40 is preferably provided with a plurality of apertures distributed between the large apertures 40d to permit the escape of steam from the chamber of the vessel and such small apertures or ports are also provided in the racks 30 and 35.

Although one form of the invention has been shown and described by way of illustration, it will be understood that it may be constructed in various other embodiments which come within the scope of the appended claims.

We claim:

1. An egg cooker comprising a vessel adapted to contain a quantity of water, means in the lower part of said vessel for heating and vaporizing said water, a rack extending across the upper part of said vessel and having apertures therein through which steam may pass, and a pan located above said rack and having an annular flange extending outwardly and downwardly from its top edge to rest on the upper edge of said vessel and thereby forming a steam chamber around the body of said pan, said pan having apertures in the downwardly extending portions of said annular flange to permit the escape of steam from said chamber.

2. An egg cooker comprising a vessel adapted to contain a quantity of water, means in said vessel for heating and vaporizing said water, a rack in the form of a metal plate extending horizontally across the upper part of said vessel and having apertures therein to receive and support a plurality of eggs, the metal at the edges of said apertures being cut and deflected upwardly to form openings through which steam may pass in contact with said eggs and to form inclined tongues adapted to deflect the steam over the surfaces of said eggs above said rack, and a cover detachably supported on said vessel and adapted to extend over said eggs.

3. An egg cooker comprising a vessel adapted to contain a quantity of water, means in said vessel for heating and vaporizing said water, a rack in the form of a metal plate extending horizontally across the upper part of said vessel and having apertures therein to receive and support a plurality of eggs, the metal at the edges of said apertures being cut and deflected upwardly to form openings through which steam may pass in contact with said eggs and to form inclined tongues adapted to deflect the steam over the surfaces of said eggs above said rack, and a cover detachably supported on said vessel and adapted to extend over said eggs, said cover having means for permitting the escape of steam therethrough.

4. An egg cooker comprising a vessel adapted to contain a quantity of water, means in the lower part of said vessel for heating and vaporizing said water, a rack extending across the upper part of said vessel and having apertures therein through which steam may pass, and a pan located above said rack and having an annular flange extending outwardly and downwardly from its top edge to rest on the upper edge of said vessel and thereby forming a steam chamber around the body of said pan.

5. An egg cooker comprising a vessel adapted to contain a quantity of water, spaced electrodes in the lower part of said vessel adapted to be connected by said water, means for connecting said electrodes in an electric circuit, a rack extending across the upper part of said vessel and having apertures therein through which steam may pass, and a metal pan located above said rack and having a depending annular flange resting on said vessel.

6. An egg cooker comprising a vessel formed of insulating material and adapted to contain a quantity of water, spaced electrodes in the lower part of said vessel adapted to be connected by said water, said vessel having an annular upwardly extending wall provided with projecting lugs on its inner side, and a rack supported on said lugs and having apertures therein to receive a plurality of eggs supported by said rack, said apertures being formed to provide spaced edges of the rack which engage and support the eggs with intervening openings which permit the passage of steam through said rack in direct contact with said eggs.

7. An egg cooker comprising a vessel formed of insulating material and adapted to contain a quantity of water, spaced electrodes in the lower part of said vessel adapted to be connected by said water, said vessel having an annular upwardly extending wall provided with projecting lugs on its inner side, a rack supported on said lugs, and a metal pan located above said rack and having an annular flange resting on said lugs.

8. An egg cooker comprising a vessel formed of insulating material and adapted to contain a quantity of water, spaced electrodes in the lower part of said vessel adapted to be connected by said water, said vessel having an annular upwardly extending wall provided with projecting lugs on its inner side, a tray located above said vessel and having an annular depending flange supported on said lugs, said tray having a plurality of apertures therein, and a plurality of egg receiving cups each seated on said tray in one of said apertures.

References Cited in the file of this patent

UNITED STATES PATENTS

| | | |
|---|---|---|
| 1,994,331 | Ziskin et al. | Mar. 12, 1935 |
| 2,061,837 | Hanks et al. | Nov. 24, 1936 |
| 2,146,511 | Peirce | Feb. 7, 1939 |
| 2,419,674 | Caplan | Apr. 29, 1947 |
| 2,518,566 | Osterheld | Aug. 15, 1950 |